March 7, 1933. H. WITTEMEIER 1,900,476
FILTERING APPARATUS
Filed Sept. 9, 1929
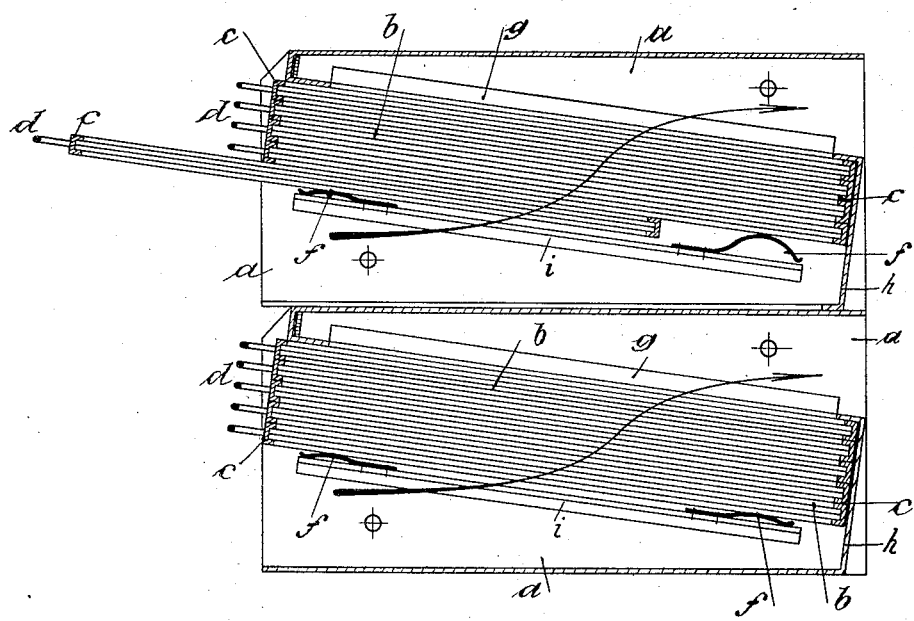
Inventor:
Hans Wittemeier
per Kirchbauer
atty.

Patented Mar. 7, 1933

1,900,476

UNITED STATES PATENT OFFICE

HANS WITTEMEIER, OF BERLIN-GRUNEWALD, GERMANY, ASSIGNOR TO MIDWEST MANUFACTURING COMPANY, INC., OF LOUISVILLE, KENTUCKY, A CORPORATION OF NEW YORK

FILTERING APPARATUS

Application filed September 9, 1929, Serial No. 391,416, and in Germany October 27, 1928.

My invention relates to filtering apparatus for gaseous fluids and more particularly to filtering apparatus of the type in which the filters consist of grids or screens.

It is an object of my invention to improve a filtering apparatus of this kind with a view to permit extraction and inspection of the filters without interfering with the operation of the filtering apparatus.

To this end I subdivide the filters into a plurality of units, each unit having a frame, and this frame being provided with faces serving as sliding surfaces for the several units, and also as packing surfaces for obtaining a tight fit of the units with the frame of the filter.

With filtering apparatus of the kind referred to, several grids or plates of sheet metal which are perforated in the manner of a grid or screen are superimposed to form a cell, preferably in such arrangement that the holes and the solid bridges of the grids or screens are staggered. In this manner, a labyrinth is obtained in which the gaseous medium is reflected and broken at an infinite number of angles and obstacles so that the dust is completely separated. The action of such a filtering apparatus may be improved by reducing the width of its open spaces toward the rear of the filtering apparatus, that is, decreasing the width gradually from the entrance to the exit of the air.

Filtering apparatus of this kind, that is, having flat filters, are in some respects superior to filters of other types but, on the other hand, involve certain drawbacks. For instance, it is necessary to disassemble the complete filtering apparatus for cleaning which is inconvenient and tedious. Nor is it possible to extract filters for exchanging or inspecting them independently of the others, as generally they will stick to each other, and so it is necessary to disassemble the filtering apparatus, just the same as for cleaning.

It has been proposed to space apart the several filters so that they can be extracted separately and without interfering with the others, but in this case a valve or damper must be provided for closing the gap which is formed by the extraction of the filters so that filtered air will not flow through the gap. Such means are comparatively expensive and complicated but still they do not effect a complete closure.

It will be understood that in the types of filtering apparatus aforesaid it was not practicable to extract a filter or several filters without interfering with the operation of the filter, or without necessitating the complete shut-down of the filter.

These drawbacks are overcome in my novel filtering apparatus and at the same time the filtering apparatus is improved in other respects so that its operation is facilitated and its initial cost is reduced. These advantages are particularly important in view of the fact that filtering apparatus for gaseous fluids are used for many purposes and therefore it is important to manufacture them on a quantity production basis.

In the drawing affixed to this specification and forming part thereof a filtering apparatus having filters arranged in units according to my invention, is illustrated diagrammatically by way of example.

In the drawing, $a$, $a$ are two filtering chambers shown in section. The chambers are closed at the top and at the bottom but are open at their front and rear ends. The filters are shown in inclined position but may be arranged in any suitable position as required.

$b$ are the filters, which are grids or screens as described and any desired number of filters is combined into a unit in a holder $c$ with a handle $d$. It will be understood that in this manner each unit constitutes a separate layer of filters. Air flows through the unit in the direction indicated by the arrows, the air to be filtered entering at the lower face of each unit, and the filtered air being discharged at the upper face.

$h$ is a frame in each chamber $a$, $a$, $g$ is a top plate on the frame which is cut out to permit free passage of the air, and is adapted to be abutted against by the holder $c$ of the top unit. $i$ are supports below the several units, and $f$, $f$ are springs on the support which exert upward pressure on the lowest holder $c$. In this manner the units are held in position throughout, as the pressure exerted on the lowest unit by the springs $f$ is transmitted to the frame $g$ through the several units.

When it is desired to clean the filtering apparatus the lowest unit is removed first as this will be the one which is loaded most heavily with impurities. In the upper chamber $a$ the lowest holder is shown as partly extracted.

When a unit is extracted or inserted, the resistance is a minimum as the flat holders $c$ of the unit cause very little friction at the faces of their own frames, at the top plate $g$, and at the springs $f$. With the units in an inclined position as illustrated the upper units would move downwards when one of them is removed at the bottom of the filter and gaps would form at the top or at the sides of the apparatus through which uncleaned air might flow to the exit. This is prevented by the springs $f$ which, as is shown for the rear spring in the upper chamber $a$, immediately rise at the rear of a partly extracted unit and support the units above, so that the top unit is always held engaged with the top plate $g$. In this manner, the means referred to in the introduction for preventing flow of unfiltered air through the apparatus, are rendered unnecessary and the apparatus remains tight when its units are exchanged. When the unit at the bottom has been extracted, a clean unit is inserted at the top, and in this manner the units are gradually exchanged and replaced by cleaned ones without in any way interferring with the operation of the apparatus.

It is understood that the holders $c$ need not extend all round the filters of a unit but only parts of a holder may be provided for keeping the filters in the proper position with respect to each other and for presenting surfaces on which the units slide with respect to each other and to the top plate $g$. The top plate has been shown as a complete frame of channel section but obviously any other section may be provided, and the top plate, like the holders $c$ of the unit, need not be a complete part.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A filtering apparatus comprising a frame, filtering units in said frame, each unit including a set of filters and a holder surrounding said set, said holders being adapted to slide, and to fit tightly, in said frame and on each other, and means for exerting an upward pressure on the lowest holder.

2. A filtering apparatus comprising a frame, filtering units in said frame, each unit including a set of filters and a holder surrounding said set, said holders being adapted to slide, and to fit tightly, in said frame and on each other, and a spring arranged in a fixed position with respect to said frame and adapted to exert an upward pressure on the lowest holder.

In testimony whereof I affix my signature.

HANS WITTEMEIER.